United States Patent

Berger

[15] 3,692,812
[45] Sept. 19, 1972

[54] METHOD OF PRODUCING ALKOXY-SUBSTITUTED MERCAPTOALKYL SILANES

[72] Inventor: Abe Berger, Schenectady, N.Y. 12309
[73] Assignee: General Electric Company
[22] Filed: April 21, 1971
[21] Appl. No.: 136,259

Related U.S. Application Data

[63] Continuation-in-part of Ser. No. 789,401, Jan. 6, 1969, abandoned.

[52] U.S. Cl...260/448.2 E, 204/158 R, 260/448.2 N, 260/448.8 R
[51] Int. Cl............C07f 7/08, C07f 7/10, C07f 7/18
[58] Field of Search..................260/448.8 R, 448.2 E

[56] References Cited

OTHER PUBLICATIONS

Bazant et al., " Organosilicon Compounds," Vol. 1, Academic Press, N.Y. (1965), p. 347.

*Primary Examiner*—Tobias E. Levow
*Assistant Examiner*—P. F. Shaver
*Attorney*—Donald J. Voss, E. PHilip Koltos, Frank L. Neuhauser and Oscar B. Waddell

[57] ABSTRACT

Alkoxy-substituted mercaptoalkyl silanes are prepared by reacting an olefinically substituted silane with a thioacid and treating the reaction product with an alcohol so as to form or maintain an alkoxy substituent, while forming a mercaptoalkyl substituent of the original olefinic portion. The process is also applicable to the production of polymeric organosilicon materials with mercaptoalkyl substituents.

10 Claims, No Drawings

METHOD OF PRODUCING ALKOXY-SUBSTITUTED MERCAPTOALKYL SILANES

This application is a continuation-in-part of copending application Ser. No. 789,401 filed Jan. 6, 1969 now abandoned.

BACKGROUND OF THE INVENTION

Numerous methods have been proposed in the prior art for preparing mercaptoalkyl-substituted silanes. For example, German Pat. No. 1,163,818 describes the reaction of a haloalkyl-substituted silane with thiourea in ethanol, followed by the decomposition of the isothiouronium salt with ammonia to form the mercaptoalkyl substituent. This process is, however, subject to some difficulties because of the unavailability of the starting materials, the fact that the initial reaction must be run in ethanol, and the lower yields of product experienced.

Other processes utilize the anti-Markownikoff addition of hydrogen sulfide to olefinic silanes. However, the mercaptoalkyl group formed according to this reaction can compete for additional olefinic silanes during the reaction and an excess of hydrogen sulfide, in liquid form, must be employed to prevent the competing reaction. The difficulty of handling and storing this excess reactant material is, of course, obvious.

Of course, various other methods are known to the prior art but, in general, each requires the use of relatively expensive reaction components, or is carried out under such conditions that the formation of a mercaptoalkyl substituted silane with other functional substituents is not possible.

SUMMARY OF THE INVENTION

In accordance with the present invention, a method has been developed for forming mercaptoalkyl-substituted silanes having other functional substituents through a process employing easily available materials, and easily attainable and controllable reaction conditions, and resulting in high yields. The process can best be illustrated by the following generic reactions:

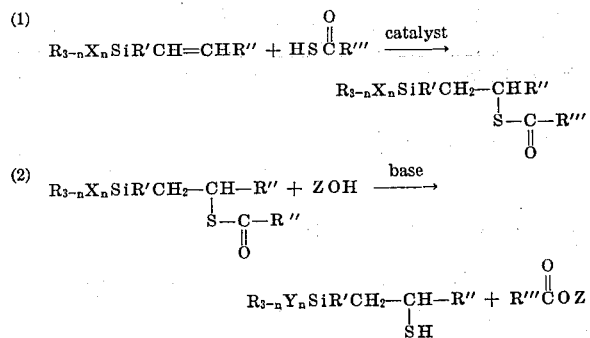

where $n$ is from 1 to 3, Y is OZ, X is selected from the class consisting of OZ, amine and aminoxy, where Z is an alkyl radical of from 1 to 7 carbon atoms, preferably from one to three carbon atoms, each R is an organic radical of not more than 18 carbon atoms individually selected from the class consisting of alkyl radicals, aryl radicals, alkaryl radicals, and aralkyl radicals, R' is a divalent saturated hydrocarbon radical and R" is a monovalent saturated hydro-carbon radical or hydrogen, the total number of carbon atoms in the R' and R" radicals, together, is from 0 to 20, R''' may have up to 10 carbon atoms and R'''' is a hydrocarbon radical of up to 15 carbon atoms including alkyl, aryl, aralkyl and alkaryl and is more preferably an alkyl radical of from one to three carbon atoms.

In the case where the silicone compound is a polysiloxane, the method of the present case is defined by the following reactions:

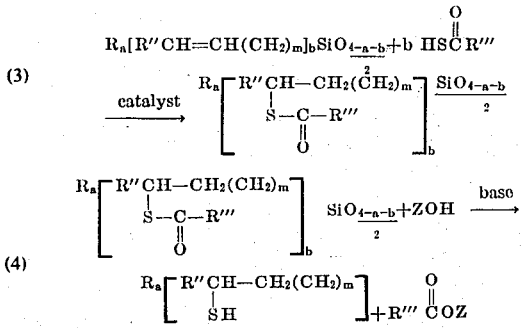

In reactions (3) and (4), R, R", R''' and Z are as defined previously and $m$ varies from 0 to 20. Also in the above formulas, a varies from 1.08 to 2.5, b varies from 0.009 to 0.97 and the sum of a plus b varies from 2.01 to 3.5. In the above reaction, b moles of the thioacid is reacted with the polysiloxane to obtain full substitution in the polysiloxane and the resulting product is reacted with b moles of the alcohol to obtain the mercapto terminal groups. It can be appreciated that in accordance with the present invention, less or more than b moles of the above reactant may be used to obtain full substitution or less than full substitution in the polysiloxane.

Each of the above reactions is carried out in the absence of a solvent, employing only the reagent indicated in the particular equations. The reactions (1) and (3), as indicated, require a catalyst and this can be any of the standard free radical catalysts. The reactions of equations (1) and (3) can be run at various temperatures from room temperature to 130°C, while the final reactions (2) and (4) in which the mercaptoalkyl silane is formed, is generally run at reflux temperatures and at atmospheric pressure.

Thus, the reaction is formed with readily available reactants and at standard conditions. The yields, for each of the reactions, can be as high as about 90 percent and, as indicated, the finally produced product is a mercaptoalkyl-substituted organosilicon compound which is either an alkoxy substituted monomeric silane or a polymeric siloxane. As is well known in the art, the alkoxy-substituted silanes are particularly valuable as they can be reacted with other organosilanes to form various desired products.

DESCRIPTION OF THE PREFERRED EMBODIMENTS

The alkenyl silanes employed as reactants according to equation (1) are readily available by various routes. For example, they can be formed by the thermal condensation reaction of vinylic halides with silicon hydrides. Similarly, they can be formed by the addition of silicon hydrides to alpha-omega diolefins, or other diolefins. Alpha-omega diolefins are readily available through the thermal cracking procedures employed on cycloolefins and the oligomerization or co-oligomerization of butadiene. Each of these processes is well known in the art.

The alkenyl polysiloxanes employed as reactants in reaction (3) are well known materials. They may be prepared by hydrolyzing alkenylchlorosilanes with organochlorosilanes and condensing the resulting siloxane in the presence of a condensation catalyst. Further, the cyclic siloxanes that are formed in the hydrolysis step may be collected. These cyclics include both cyclic polysiloxane having alkenyl substituent groups thereon or such as tetramethylvinylpolysiloxane, as well as only saturated hydrocarbon substituent groups thereon such as octamethylpolysiloxane. These cyclics are then condensed or equilibrated with the appropriate chain-stoppers such as hexamethylsiloxane in the presence of a condensation catalyst such as KOH to obtain the desired polysiloxane products.

In addition to the alpha-omega diolesins, as noted in the description of the generic equations and formulas, the olefinic unsaturation in the silyl or polysiloxane substituent can be at a position other than omega to the silicon atom. Thus, olefins other than those described above can be employed. This distinguishes the process of the present invention from the prior art where the process was limited to the use of silylalkyl halides wherein the halide must be a primary halide attached to gamma carbon atoms or beyond since the beta position and/or secondary or tertiary halides results in a breaking down of the compound.

The olefinically-substituted silyl compound or polysiloxane is reacted with the thioacid, as previously noted, in the absence of a solvent. In general, the reactants are employed in a stoichiometric ratio, though a 10 percent excess of either of the reactants is permissible. A catalyst is necessary for the reaction and, in general, can be of any of the free radical catalysts known in the art. For example, the reaction can be conducted employing heat, ultraviolet light, peroxides, or an azo catalyst such as azo-bis-isobutyronitrile. When a free radical catalyst, other than the heat or ultraviolet light is employed, the amounts are generally those catalytic amounts previously employed in the art.

The order of addition of the reactants in the reaction according to equations (1) and (3) is not critical. It is preferably, however, to add the thioacid to the olefinically substituted organosilicon compound. This is to avoid any tendency of the olefinic substituents to react between themselves. The time of addition is also immaterial and the two reactants can be mixed together as quickly as desired. The reaction requires approximately 4 to 5 hours at room temperature, employing ultraviolet light. With higher temperatures and other catalysts, the reaction can proceed more quickly. It is not necessary that the thioacid salt produced according to equations (1) and (3) be separated from the reaction mixture prior to treatment with the alcohol and base. If purification is desired, a rough purification, sufficient for further reaction, can be accomplished by vacuum distillation.

With regard to the reaction of equations (2) and (4), the alcohol employed is generally employed in about a 100 percent excess. The amount of alcohol is determined, of course, not only by the amount necessary to convert the thioacid salt to the mercaptan but, further, by the amount necessary to convert any amine or aminoxy groups to the alkoxy substituent, when the reactant compound is a monomeric organosilicon compound.

The base employed in the alcohol treatment is a nonprotonic base. Preferably, the sodium salt of the alkoxide corresponding to the alcohol is employed in an amount of from 1 to 4 percent, based on the organosilicon compound. While the amount remains the same with any other base which may be desired, there is little advantage to using other bases in the alcoholic reaction as they are generally converted to the alkoxide, in any event.

Again, the order of addition of the reactants is not critical. The reaction is generally carried out at reflux temperature under atmospheric conditions. Approximately 2 to 3 hours is required for reaction and the ultimate product is separated during the course of this reflux.

The following examples are given to further illustrate the process of the present invention. These examples should be considered illustrative only, of the reaction of the present invention and not as limiting in any way its scope as covered in the appended claims. All parts are by weight.

EXAMPLE 1

This example will illustrate the formation of dimethylethoxysilyl n-octyl thioacetate in accordance with equation (1). A reaction mixture was prepared consisting of 304 parts thioacetic acid and 850 parts ometa-dimethylethoxysilyloct-1-ene. This reaction mixture was exposed to ultraviolet light for approximately 4 hours at room temperature. A vapor phase chromatography scan indicated good conversion to the desired product. The reaction mixture was fractionated and a yield of 85 percent of the desired product was obtained at 129°C, and 0.11 mm pressure. The product was tested by infrared and showed the expected carbonyl absorption at 5.9 microns, consistent with the proposed structure:

(5)
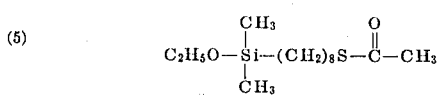

EXAMPLE 2

According to this example, the omega-dimethylethoxysilyl n-octyl thioacetate produced according to Example 1 was subjected to the transesterification reaction of equation (2) to produce the desired omega-dimethylethoxy-silyl-n-octyl mercaptan. A reaction vessel was equipped with a stirrer, fractionation equipment and a thermometer. A quantity of 87 parts of the thioacetate of formula (5) and 200 parts of ethanol were placed within the reaction vessel and the stirrer started. A quantity of 1 part of sodium methoxide was added to the reaction mixture, which was then brought to reflux so that the ethyl acetate and ethanol were continuously removed. After removal of all of the low boilers, the remaining material was distilled at reduced pressure. The product was collected at 96°C and a pressure of 0.08 mm in a yield of approximately 92 percent. The infrared scan showed the absence of the carbonyl peak present in the original reaction product of formula (5). The product of this example was thus consistent with the formula:

(6) 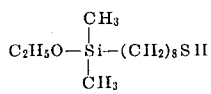

EXAMPLE 3

This example will illustrate the preparation of triethoxysilylethyl thioacetate according to equation (1). A reaction mixture was formed consisting of 760 parts of vinyltriethoxysilane and 304 parts of thioacetic acid. This reaction mixture was subjected to ultraviolet light for approximately 4 hours and was then fractionated, as described in Example 1. The product distilled at 90°C and 0.6 mm in a yield of 83 percent. The infrared spectrum was consistent with the proposed structure:

(7) 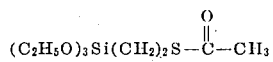

EXAMPLE 4

The thioacetate of Example 3 was reacted to produce the desired mercaptoalkyl silane. A reaction vessel, as described in Example 2, was charged with 133 parts of the triethoxysilylethyl thioacetate of Example 3 and 60 parts of ethanol. A quantity of 0.5 part sodium ethoxide was added under stirring and the reaction mixture was heated to reflux. The ethylacetate-ethanol azeotrope which formed was continuously removed and, following removal of all low boilers at atmospheric pressure, the reaction mixture was fractionally distilled at reduced pressure. The product, consistent with the formula:

$$(C_2H_5O)_3Si(CH_2)_2SH , \quad (8)$$

was collected at a temperature of 80°C and 6.4 mm pressure.

EXAMPLE 5

In the same manner as in Example 1, a quantity of 172 parts of the olefinically substituted organosilane of formula:

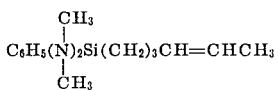

is reacted with 104 parts of the thioacid:

The resulting product:

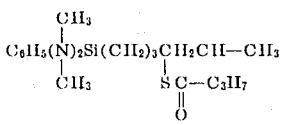

is not purified, but is reacted, in the manner of Example 2 with 500 parts of butanol and 3 parts of sodium butoxide. On fractional distillation, the product:

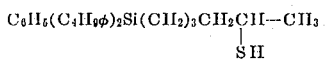

is recovered.

EXAMPLE 6

Allylpentamethyldisiloxane was prepared by the reaction of sodium trimethylsilanolate with allyldimethylchlorosilane. To 188 parts of the siloxane (1 mole) which is heated to 80°C under a nitrogen atmosphere there is added slowly 76 parts redistilled thiolacetic acid (1 mole). An exothermic reaction occurs. After complete addition, an external heat source is applied and the reaction is kept at 90°C for an additional hour. The low boilers were then removed by holding the flask at 100°C at 100 mm for 30 minutes. The flask is cooled and there is added 200 ml ethanol and 1 g sodium ethoxide. The reaction is fractionated such that an azeotrope of ethanol-ethyl acetate is continuously removed. When the ester removal is complete, excess alcohol is removed followed finally by the mercaptodisiloxane at reduced pressure. The material structure is confirmed by infrared and nuclear magnetic resonance and is, $$HSCH_2CH_2CH_2Si(CH_3)_2OSi(CH_3)_3 .$$

EXAMPLE 7

The compound 3-vinylheptamethyltrisiloxane is prepared by the reaction of two equivalents of sodium trimethylsilanolate with vinylmethyldichlorosilane. Purified thiolacetic acid is added to an equivalent molar quantity of the above trisiloxane at 80°C containing 1 percent by weight of azo-bis-isobutyronitrile. After the addition is complete, the reaction is kept at 80°C for an additional 2 hours and then is stripped of low boilers at a reduced pressure of 150 mm and a pot temperature of 100°C. The product is diluted with 300 ml methanol containing 2 g sodium methoxide. Upon fractionation, an azetropic mixture of methanol-methylacetate is removed. The product remaining behind in the pot is the corresponding 3-mercaptoethyl heptamethyl trisiloxane identified by IR and nuclear magnetic resonance and has the following structure:

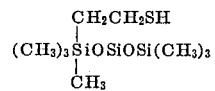

EXAMPLE 8

By the reaction of vinyltrichlorosilane with three equivalents of sodium trimethylsilanolate, the following composition is obtained:

$$CH_2=CH-Si[OSi(CH_3)_3]_3$$

To this material dissolved in toluene is added a 10 percent molar excess of thioacetic acid at 80°C using a 0.5 percent acetyl peroxide (present as a 25 percent solution in dibutyl phthalate) catalyst. Excess thiolacetic acid is removed, followed by the addition of methanol containing a catalytic quantity of sodium methoxide. Methanol-methyl acetate azeotrope is removed followed by excess methanol. The product left behind is identified as tris-(trimethylsiloxy)mercaptoethylsilane by nuclear magnetic resonance and IR and has the following structure, $$HSCH_2CH_2Si[OSi(CH_3)_3]_3 .$$

EXAMPLE 9

A fluid is prepared by KOH catalyzed equilibration of octamethylcyclotetrasiloxane (8 equivalents) 2,4,6,8-tetramethyl-2,4,6,8-tetraalkylcyclotetrasiloxane (4 equivalents) and hexamethyldisiloxane (1 equivalent), which has the structure:

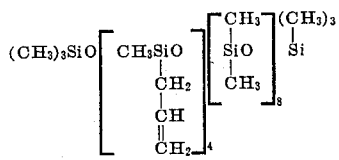

The base is neutralized with standard HCl solution, and is filtered to remove salts. There is added 1 molar equivalent of thioacetic acid per alkyl group in fluid under irradiation with an ultraviolet source. After the thiolacetic acid addition is complete, the reaction is allowed to proceed at ambient temperatures for four hours while still being exposed to ultraviolet light. Any excess acid is removed under a partial reduced pressure of 50 mm and a pot temperature of 140°C. The reaction mixture is cooled, diluted with an excess of ethanol containing 0.5 part sodium ethoxide and fractionated. When the ester-alcohol azeotrope is completely removed, excess alcohol is then removed leaving behind a fluid having mercapto alkyl substituents as shown both by IR and nuclear magnetic resonance and having the following structure:

The various products produced according to this invention have a variety of known utilities. For example, each of the products produced according to the process can be employed as metal protectants as disclosed and claimed in U.S. Pat. No. 3,346,405 of R. V. Viventi, assigned to the same assignee as the present invention.

Because of the desirability of forming the organosilanes, according to the present process, having reactive substituents, it is important that moisture be excluded from the reaction. Thus, the substituents on the silicon atom, when monomeric materials are employed, should not be hydroxyl groups, nor should water be permitted into the process at any point. Of course, if organopolysiloxanes are desired as final products, then the admission of water at various points in the process is not harmful, nor is the presence of hydroxyl substituents.

The organosilanes with reactive substituents, produced according to the process of the present invention, can, of course, be reacted with other organosilanes, such as the chlorosilanes, to produce a desired end product having any required amount of mercaptoalkyl substituents.

I claim:

1. A process for forming a product having the formula:

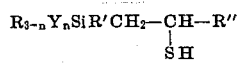

comprising reacting an olefinically substituted organosilicon compound of formula:

$$R_{3-n}X_nSiR'CH=CHR''$$

with a thioacid of formula:

and reacting the resulting thioacid salt with an alkanol, where Y is OZ; Z is an alkyl radical of from one to seven carbon atoms; X is selected from the class consisting of OZ, amine, aminoxy; R is selected from the class consisting of alkyl, aryl, alkaryl and aralkyl substitutents; R' is a divalent saturated hydrocarbon atom; R'' is selected from the class consisting of monovalent saturated hydrocarbon radicals and hydrogen, where the total number of carbon atoms in R' and R'' combined is from 0 to 20; R''' is selected from the class consisting of alkyl, aryl, aralkyl and alkaryl radicals of from one to 15 carbon atoms; and n is from 1 to 3.

2. The process of claim 1 wherein the reaction of the thioacid with the olefinically substituted silane is carried out in the presence of ultraviolet light.

3. The process of claim 1 wherein the reaction product of the olefinically substituted silane and the thioacid is treated with a base, in conjunction with the alkanol.

4. The process of claim 3 wherein the base is an alkali metal salt of the alkanol.

5. The process of producing

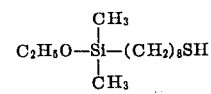

wherein omega-dimethylethoxysilyloct-1-ene is reacted with thioacetic acid and the reaction product is reacted with ethanol in the presence of sodium ethoxide.

6. The method of producing $$(C_2H_5O)_3Si(CH_2)_2SH$$

wherein vinyl triethoxysilane is reacted with thioacetic acid and the reaction product is reacted with ethanol in the presence of sodium ethoxide.

7. A process for forming a product having the formula,

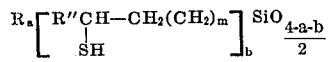

comprising reacting an olefinically substituted polysiloxane of the formula,

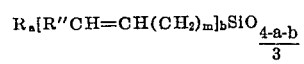

with a thioacid of the formula,

and reacting the resulting thioacid with an alkanol, where R is selected from the class consisting of alkyl, aryl, alkenyl and aralkyl substituents, R'' is selected from the class consisting of monovalent saturated hydrocarbon radicals and hydrogen, where R'' may have up to 10 carbon atoms, R''' is selected from the class consisting of alkyl, aryl, aralkyl and alkenyl radicals of from one to 15 carbon atoms, $m$ varies from 0 to 20, $a$ varies from 1.08 to 2.5, $b$ varies from 0.009 to 0.97 and the sum of a plus b varies from 2.01 to 3.5.

8. The process of claim 7 wherein the reaction of the thioacid with the olefinically substituted polysiloxane is carried out in the presence of ultraviolet light.

9. The process of claim 7 wherein the reaction product of the olefinically substituted polysiloxane and the thioacid is treated with a base in conjunction with the alkanol.

10. The process of claim 9 wherein the base is an alkali metal salt of the alkanol.

* * * * *